(12) United States Patent
Choi et al.

(10) Patent No.: US 7,738,194 B2
(45) Date of Patent: Jun. 15, 2010

(54) OPTICAL COMPONENT AND METHOD OF MANUFACTURING THE SAME

(75) Inventors: Hee Sung Choi, Gyunggi-do (KR); Bae Kyun Kim, Gyunggi-do (KR); Mi Hee Park, Gyunggi-do (KR); Hee Jin Lee, Gyunggi-do (KR); Sung Soo Park, Gyunggi-do (KR); Dong Hyun Cho, Gyungsangnam-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 64 days.

(21) Appl. No.: 12/000,922

(22) Filed: Dec. 18, 2007

(65) Prior Publication Data

US 2008/0144192 A1    Jun. 19, 2008

(30) Foreign Application Priority Data

Dec. 18, 2006  (KR) .................... 10-2006-0129522

(51) Int. Cl.
*G02B 7/02* (2006.01)
*G02B 9/00* (2006.01)
*G02B 27/10* (2006.01)

(52) U.S. Cl. ................... 359/811; 359/754; 359/619

(58) Field of Classification Search ......... 359/694–700, 359/811–822, 619, 754, 808
See application file for complete search history.

(56) References Cited

U.S. PATENT DOCUMENTS

| 5,310,623 | A | 5/1994 | Gal | 430/321 |
|---|---|---|---|---|
| 5,923,480 | A * | 7/1999 | Labeye | 359/814 |
| 6,415,068 | B1 * | 7/2002 | Sun | 385/16 |
| 7,359,124 | B1 * | 4/2008 | Fang et al. | 359/666 |
| 7,440,193 | B2 * | 10/2008 | Gunasekaran et al. | 359/666 |
| 2002/0196558 | A1 | 12/2002 | Kroupenkine et al. | 359/665 |
| 2003/0227100 | A1 * | 12/2003 | Chandross et al. | 264/1.36 |
| 2004/0184155 | A1 | 9/2004 | Kornblit et al. | 359/619 |

FOREIGN PATENT DOCUMENTS

KR   10-2004-0090640   10/2004

* cited by examiner

*Primary Examiner*—Mohammed Hasan

(57) ABSTRACT

An optical component includes a lens holder including a first electrode, an insulating structure formed on the first electrode and having a through hole provided as an optical path, and at least one second electrode formed inside the insulating structure to encompass the through hole, and at least one microlens located in the through hole and formed of transparent resin.

24 Claims, 5 Drawing Sheets

OPTICAL COMPONENT AND METHOD OF MANUFACTURING THE SAME

CROSS-REFERENCE TO RELATED APPLICATIONS

This application claims the priority of Korean Patent Application No. 2006-29522 filed on Dec. 18, 2006, in the Korean Intellectual Property Office, the disclosure of which is incorporated herein by reference.

BACKGROUND OF THE INVENTION

1. Field of the Invention

The present invention relates to an optical component, and more particularly, to an optical component having a barrel structure with micro lenses and a method of manufacturing the same.

2. Description of the Related Art

Portable imaging devices have come into widespread use in recent years, which has increased a need for high-performance microlenses.

In general, microlenses are known to be fabricated by a replica method using a mold. This replica method is broadly used to fabricate the microlenses or a microlens array having the microlenses arranged therein at a low cost. Examples of a general method of fabricating or replicating the microlenses may include a modified lithographic-galvanic (LIGA) process, isotropic etching of silicon, use of a gray scale mask, direct writing via E-beam or laser, precision machining of a mold, and reflow of a photo-sensitive material.

For example, a method of fabricating a microlens array using a reflow process of a photosensitive layer is disclosed in Korean Patent Application No. 2003-0024597. Further, in U.S. Patent Publication No. 5,310,623, a replica of a microlens is produced in a photoresist material with a gray scale mask.

However, according to the general method of fabricating microlenses (or microlens array), it costs considerable money and time to produce lenses having a desired precise shape. In addition, it is difficult to fabricate microlenses having various shapes, such as a lens having a great numerical aperture and an aspherical lens due to difficulties during a reflow process and the manufacturing of a molding.

SUMMARY OF THE INVENTION

An aspect of the present invention provides an optical component that can perform fine control on microlenses by using an electrostatic force and provide a structure for the fine control that can be used as a lens holder corresponding to a barrel structure.

An aspect of the present invention also provides a method of manufacturing the optical component.

According to an aspect of the present invention, there is provided an optical component including: a lens holder including a first electrode, an insulating structure formed on the first electrode and having a through hole provided as an optical path, and at least one second electrode formed inside the insulating structure to encompass the through hole; and at least one microlens located in the through hole and formed of transparent resin.

The at least one microlens may be in contact with the first electrode and be insulated from the at least one second electrode by the insulating structure of the lens holder.

The structure for ensuring the optical path may vary according to light transmittance of the first electrode.

The first electrode may be formed of a transparent material.

The microlens may be formed at a region of the first electrode that is provided as a bottom surface of the through hole. The lens holder may further include a transparent substrate, and the first electrode is formed on the transparent substrate.

The first electrode maybe formed of an opaque electrode material and may have an opening formed to ensure an optical path.

The opening of the first electrode may have a smaller diameter than the through hole such that the first electrode provides a projection having a circumferential shape. The projection may provide a connection between the first electrode and the microlens, and may be used as a holding unit for the microlens.

The lens holder may further include a transparent substrate, and the first electrode may be formed on the transparent substrate.

The second electrode may include a plurality of second electrodes, and the plurality of second electrodes may be laminated inside the insulating structure and insulated from each other. In order to obtain a more precise shape of the microlens, at least some of the plurality of second electrodes may be separated from inner side walls of the through hole by different distances.

An optical component having a plurality of micro lenses arrayed therein may be provided.

Here, a through hole of an insulating structure and a microlens mounted to the through hole may include a plurality of through holes and a plurality of microlenses, respectively. The through holes may be arranged in a matrix including a plurality of rows and in a plurality of columns.

The first and second electrodes may be formed in a plurality of patterns separated in the rows and the columns of the through holes.

According to another aspect of the present invention, there is provided an optical component formed as an assembly that includes a plurality of optical components laminated therein to have the same optical path.

At least some of the plurality of optical components may be laminated so that openings of through holes thereof face one direction. Alternatively, at least one pair of the plurality of optical components may be laminated so that the openings of the through holes thereof face each other or opposite directions.

According to still another aspect of the present invention, there is provided a method of manufacturing an optical component, the method including: preparing a lens holder including a first electrode, an insulating structure formed on the first electrode and having through holes provided as optical paths, and at least one second electrode formed in the insulating structure to encompass the through holes; providing transparent liquid resin to each of the through holes to form a primary lens shape, applying a voltage to the first and second electrodes by using an electrostatic force generated therebetween such that the liquid resin having the primary lens shape has a desired secondary lens shape, and forming the microlens by curing the liquid resin having the secondary lens shape.

According to yet another aspect of the present invention, there is provided an apparatus for manufacturing an optical component including a lens holder having a first electrode, an insulating structure formed on the first electrode and a through hole provided as an optical path, and at least one second electrode formed inside the insulating structure to encompass the through hole. Here, the lens holder may control the shape of liquid resin inserted into the through hole to form a lens by using the first and second electrodes. Further, the lens holder may remain in a final product and be used as a barrel structure.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1A:
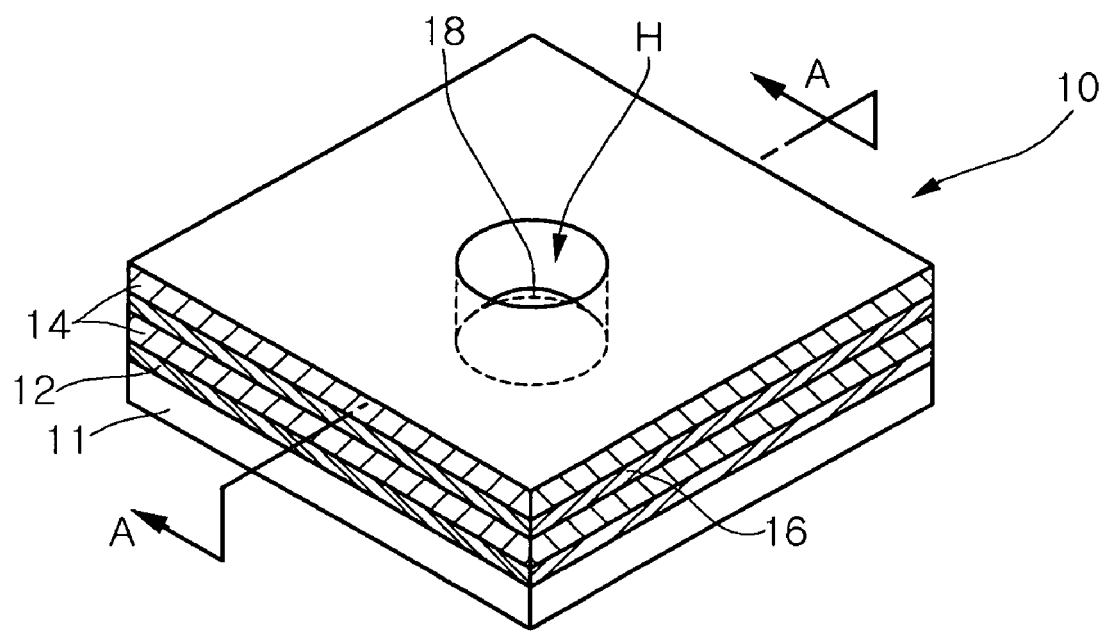
FIG. 1A is a perspective view illustrating an optical component according to one exemplary embodiment of the present invention.
Figure 1B:
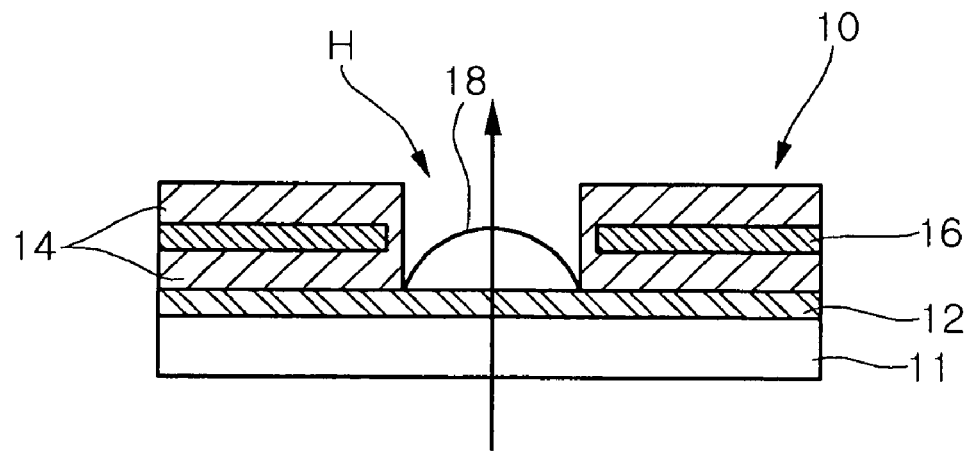
FIG. 1B is a side cross-sectional view illustrating the optical component according to one exemplary embodiment of the present invention.

FIG. 1A is a perspective view illustrating an optical component according to one exemplary embodiment of the present invention. FIG. 1B is a cross-sectional view illustrating a side cross-sectional view illustrating the optical component according to one exemplary embodiment of the present invention.

As shown in FIG. 1A, an optical component 10 according to one exemplary embodiment of the present invention includes a microlens 18 and a lens holder that accommodates the microlens 18. The lens holder includes a first electrode 12, an insulating structure 14 that is formed on the first electrode 12, and a second electrode 16 that is disposed inside the insulating structure 14. The lens holder according to this embodiment may further include a transparent substrate 11 on which the first electrode 12 is formed.

As shown in FIGS. 1A and 1B, the insulating structure 14 that forms the lens holder has a through hole H that ensures an optical path L. The through hole H may have a cylindrical structure. Further, the second electrode 16 is disposed inside the insulating structure 14. The first electrode 12 and the second electrode 16 are used as a unit for applying an electrostatic force that is used to control the shape of the microlens 18 when forming the lens. There is a uniform interval between the second electrode 16 and the first electrode 12. The second electrode 16 encompasses the through hole H to obtain a desired lens structure.

The first electrode 12 is formed on the transparent substrate 11. In this embodiment, the first electrode 12 may be formed of a known transparent electrode material such as an ITO (indium tin oxide). Even when the first electrode 12 closes a bottom surface of the through hole H of the insulating structure 14, since the first electrode 12 is formed of the transparent material, the optical path L that is provided along the through hole H can be effectively ensured. Further, the first electrode 12 stably supports the microlens 18.

When the microlens 18 is formed (that is, before complete curing), the microlens 18 according to this embodiment may be more precisely controlled by using an electrostatic force that is generated from the structure including the first and second electrodes 12 and 16 provided in the above-described lens holder so that the microlens 18 has a desired profile. As such, the microlens 18 is formed of a curable material whose profile can be changed by the electrostatic force. Curable transparent liquid resin that has conductivity or contains electrolyte components may be appropriately used as the material of the microlens 18.

Further, in order to increase the capability of controlling the shape of the lens by using the electrostatic force under the same voltage, the microlens 18 may be in contact with the first electrode 12 and be insulated from the second electrode 16 by the insulating structure 14 of the lens holder.

As such, the lens holder that is used in this embodiment includes the first and second electrodes 12 and 16 for the fine control of the lens profile, and can be used as a barrel structure that ensures the optical path L and supports the lens 18.

The present invention can be modified into various forms and implemented. More specifically, the structure for ensuring the optical path can be variously modified and implemented according to light transmittance of the lens holder, especially the material of the first electrode (refer to FIGS. 2A and 2B). Further, in order to more accurately control the lens profile, the electrode structure, especially the arrangement and number of second electrodes may be modified in a various manner (Refer to FIG. 2C).

Figure 2A:
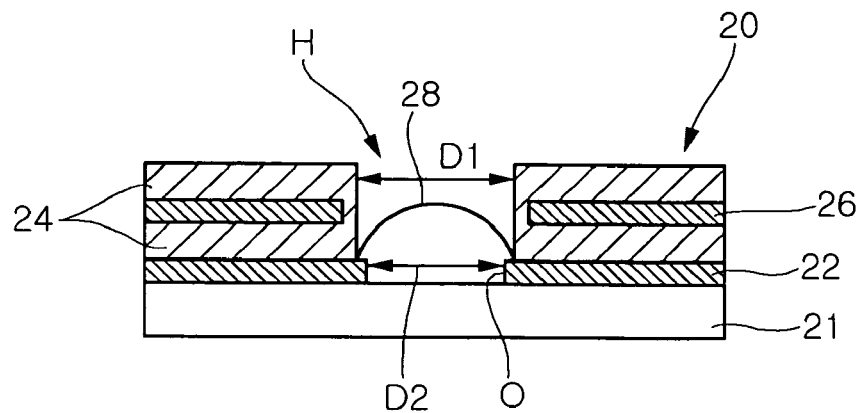
FIGS. 2A, 2B and 2C are side cross-sectional views illustrating an optical component according to another exemplary embodiment of the present invention.
Figure 2B:
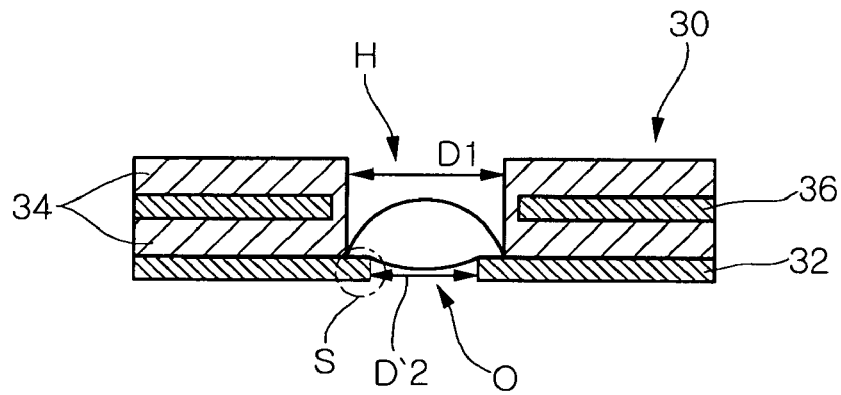

FIGS. 2A and 2B illustrate another exemplary embodiment of the present invention. In FIGS. 2A and 2B, an optical component that uses a non-transparent electrode material that forms a first electrode is exemplified.

Referring to FIG. 2A, an optical component 20 includes a microlens 28 and a lens holder that accommodates the microlens 28.

Like the optical component shown in FIG. 1B, the optical component 20, shown in FIG. 2A, has a lens holder that includes a transparent substrate 21, a first electrode 22, an insulating structure 24, and a second electrode 26. Further, the first electrode 22 includes an opening O. The opening O is formed at a position corresponding to a through hole H of the insulating structure 24 to thereby ensure an optical path. This structure may be advantageous when the first electrode 22 is formed of a non-transparent material.

In this embodiment, the opening O of the first electrode 22 may have a diameter D2 that is smaller than a diameter D1 of the through hole H. Since the first electrode 22 can be connected to the microlens 28, it is possible to ensure a driving force that is required to control the profile.

On the other hand, as shown in FIG. 2B, an optical component 30 may have a structure from which a transparent substrate is removed. The optical component has a microlens 38 and a lens holder that includes a first electrode 32, an insulating structure 34, and a second electrode 36.

The first electrode 32 may be formed of a material that may reduce light transmittance. In this case, like FIG. 2A, an opening O is formed in the first electrode 32 so as to provide an optical path. Further, in order to provide a projection S, the opening O of the first electrode 32 has a diameter D'2 that is sufficiently smaller than a diameter D1 of the through hole H within a range in which the optical path can be ensured. Preferably, the projection S of the first electrode 32 may have a circumferential shape with a predetermined width.

In this embodiment, the projection S ensures a connection to the microlens 38 and serves as a holding unit that stably supports the microlens 38. Here, on the basis of the size and shape of droplets, when liquid resin is provided to fabricate the microlens, and displacement in the controlling process, the width of the projection S that forms the holding unit may be designed in consideration of surface tension not to separate the liquid resin.

Further, as described above, the electrode structure may be modified in a various manner to more accurately control the profile of the lens.

Figure 2C:
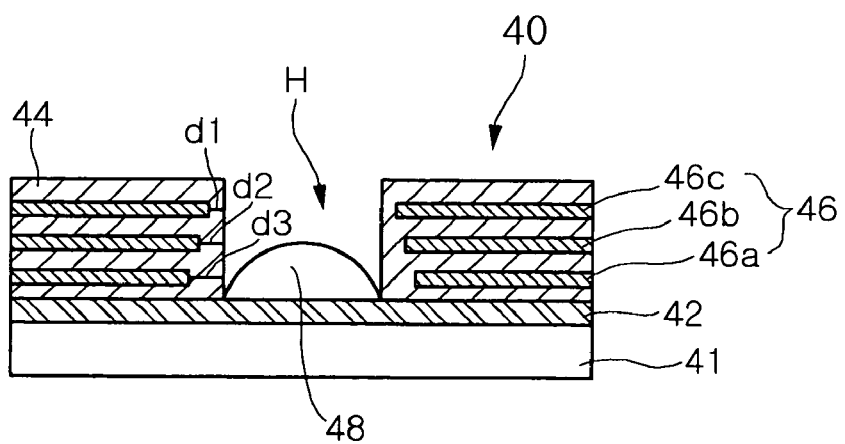

FIG. 2C illustrates an optical component in which the structure of the second electrode is modified.

Referring to FIG. 2C, an optical component 40 includes a microlens 48 and a lens holder that accommodates the microlens 48. Like the lens holder shown in FIG. 1A, this lens holder includes a first electrode 42, an insulating structure 44 that is formed on the first electrode 42 and has a through hole H, a second electrode 46 that is formed inside the insulating structure 44, and a transparent substrate 41 on which the first electrode 42 is formed.

In this embodiment, the second electrode 46 includes a plurality of electrode layers 46a, 46b, and 46c that are laminated in the insulating structure 44. The plurality of second electrode layers 46a, 46b, and 46c are electrically separated from each other and used as individual units for applying electrostatic forces to control the shape of the microlens 48 together with the first electrode 42 when forming the lens.

As such, the plurality of second electrode layers 46a, 46b, and 46c are positioned at different levels and have different areas where the electrostatic force, generated by each of the electrode layers and the first electrode, is applied, such that it is possible to more accurately control the shape of the lens.

Further, as shown in FIG. 2C, the plurality of second electrode layers 46c, 46b, and 46a are separated from the through hole H by distances d1, d2, and d3 (d1<d2<d3). Here, the distances d1, d2, and d3 between the plurality of second electrode layers 46a, 46b, and 46c and the through hole H gradually increase from top to bottom. The ranges and sizes of the electrostatic forces generated by the plurality of second electrode layers 46a, 46b, and 46c can be more accurately controlled by varying the levels of the second electrode layers 46a, 46b, and 46c, and the distances d1, d2, and d3 (d1<d2<d3) between inner side walls of the through hole H and the second electrode layers 46a, 46b, and 46c, respectively.

As such, the optical component according to the embodiment of the invention, especially the lens holder has various shapes, and can provide fine control over the lens profile and serve as a barrel that supports the lens.

Figure 3A:
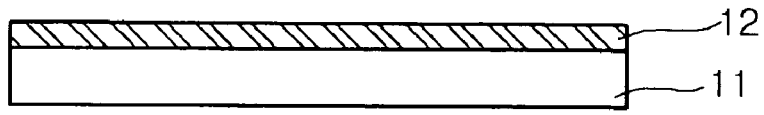
FIGS. 3A to 3D are cross-sectional views illustrating a process of manufacturing the optical component shown in FIG. 1.
Figure 4A:
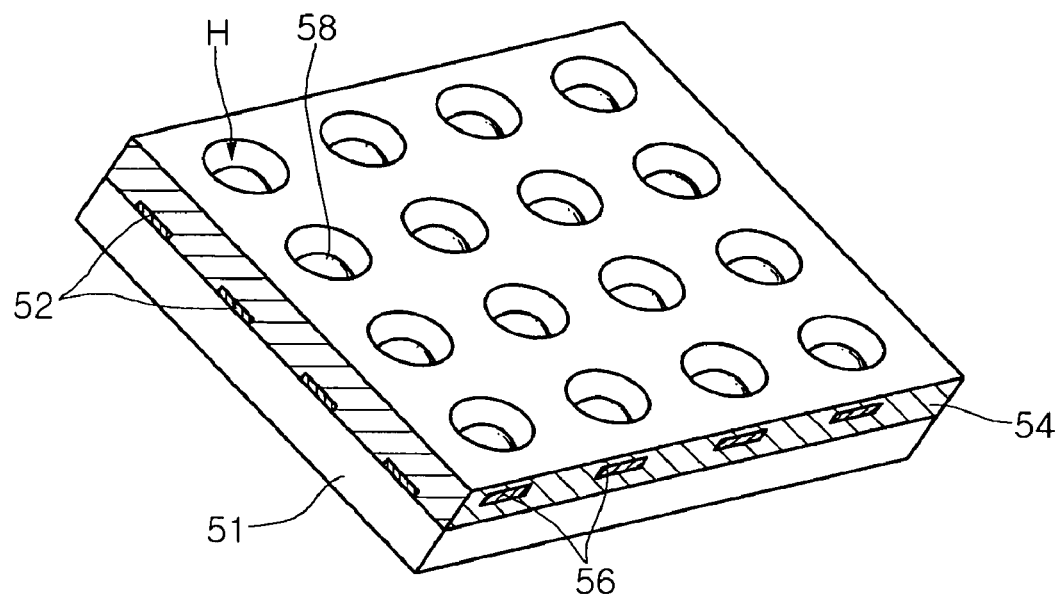
FIG. 4A is a perspective view illustrating an optical component having a microlens array structure according to an exemplary embodiment of the present invention.
Figure 4B:
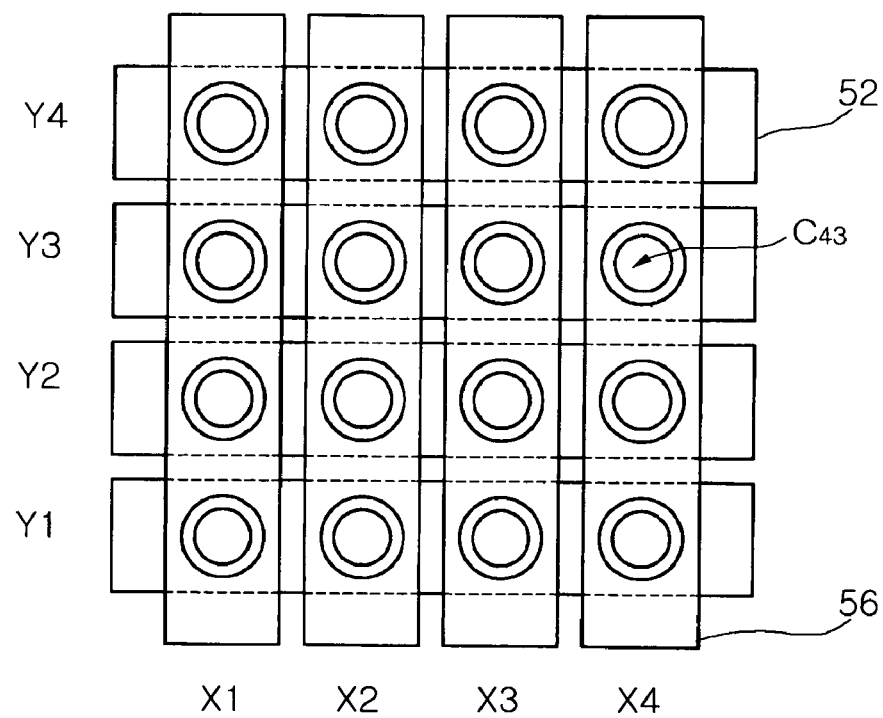
FIG. 4B is a plan view schematically illustrating electrode patterns that are used in the optical component shown in FIG. 4A.

FIGS. 3A and 4B are cross-sectional views illustrating processes of manufacturing the optical component shown in FIG. 1.

As shown in FIG. 3A, the first electrode 12 is formed on the transparent substrate 11.

The first electrode 12 may be a light-transmissive conductive oxide, such as an ITO and ZnO. Since this method corresponds to the embodiment shown in FIG. 1, a process of forming the first electrode 12 on the transparent substrate 11 is exemplified. However, as shown in FIG. 2B, the electrode layer 32 having the opening O therein may be used as a substrate without using the transparent substrate.

Figure 3B:
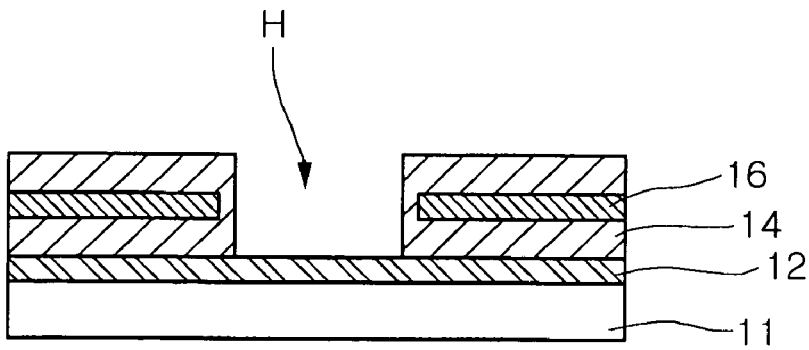

Further, as shown in FIG. 3B, the insulating structure 14 that includes the second electrode 16 and the through hole H provided as an optical path is formed on the first electrode 12.

The insulating structure 14 may be formed of an insulating organic material, such as insulating resin, as well as an insulating inorganic material, such as an insulating oxide or nitride. The insulating structure 14 may be directly formed on the substrate according to a process of forming a lower insulating layer, a process of forming a second electrode that encompasses the through hole, and a process of forming an upper insulating layer thereon. However, after the insulating structure 14 that includes the second electrode 16 encompassing the through hole H is manufactured, the insulating structure 14 may be bonded to the first electrode 12 by using a curable adhesive material (not shown). As such, the insulating structure 14 formed on the first electrode 12 has the through hole H that ensures the optical path and has the second electrode 16 that is disposed in the insulating structure 14. Therefore, the insulating structure 14 serves as a unit for applying an electrostatic force and forms a barrel structure at the same time.

Figure 3C:
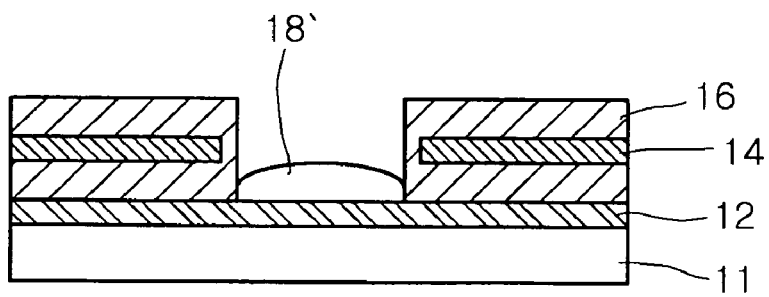

Then, referring to FIG. 3C, transparent liquid resin 18' is provided to the through hole H so as to form a primary lens shape.

The transparent liquid resin 18' may be curable and transparent. Particularly, the transparent liquid resin 18' may be curable transparent liquid resin that contains electrolyte components and has conductivity so as to be affected by the electrostatic force. For example, the transparent liquid resin 18' may be formed by mixing transparent polymer resin and electrolyte components, such as specific salt. During this process, resin droplets having a predetermined viscosity are provided to the first electrode 12 by using a micro syringe to thereby form the primary lens shape. The primary lens shape can be appropriately controlled on the basis of injection conditions as well as surface tension and the viscosity of the resin 18'. Further, when forming a predetermined shape, if a hydrophobic property is given to the surface at which the resin 18' is located, a contact angle of the resin 18' having the primary lens structure can be increased. Therefore, it is easy to manufacture lenses in a wide variety of shapes. Preferably, a part of the resin 18' having the primary shape is in contact with the insulating structure 14 so that the shape of the resin 18' can be changed by the electrostatic force generated between the first and second electrodes 12 and 16.

Figure 3D:
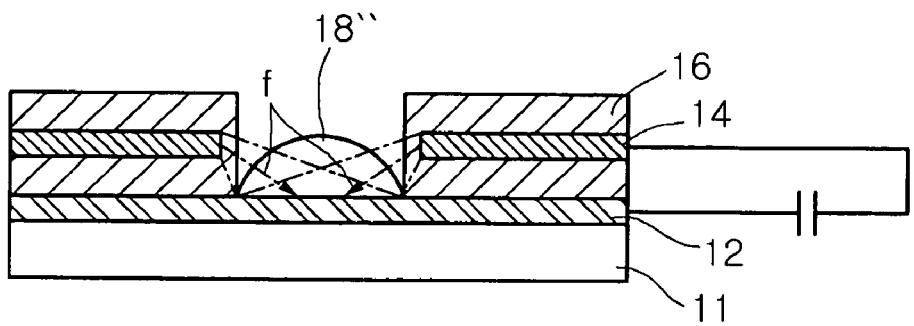

Then, as shown in FIG. 3D, a voltage is applied to each of the first and second electrodes 12 and 16 to form liquid resin 18" having a secondary lens shape. An electrostatic force is generated between the first and second electrodes 12 and 16 by the voltage applied therebetween. According to the size of the applied voltage, the resin having the primary shape can be controlled to be the resin 18" having the desired secondary shape. The size of the electrostatic force and the area where the electrostatic force is generated can be controlled according to the arrangement and number of second electrodes 16 as described in FIG. 2B. The liquid resin 18" having the secondary lens shape that is obtained through the fine control using the electrostatic force is cured by an ultraviolet ray curing method or a heat curing method according to a kind of the resin, thereby completing the optical component 10 as shown in FIG. 1B.

The present invention can be realized as an optical component that has an array structure in which a plurality of microlenses are arranged.

FIG. 4A is a perspective view illustrating an optical component that has a microlens array structure according to an exemplary embodiment of the present invention.

Referring to FIG. 4A, a microlens array optical component 50 includes a lens holder having a plurality of through holes H and a plurality of microlenses 58 that are mounted to the respective through holes H.

The optical component 50 shown in FIG. 4A has microlenses that are arranged in a 4×4 matrix. However, the present invention is not limited thereto. The optical component 50 has a lens holder that includes a transparent substrate 51, a first electrode 52, an insulating structure 54, and a second electrode 56. In this embodiment, the individual microlenses 58 and the lens holder are formed in which the first electrode 52 has an opening (refer to FIG. 2A).

The array type optical component having the plurality of microlenses is not limited to the structure similar to the embodiment shown in FIG. 2A, but may be formed to have different individual structures.

Further, the microlens array optical component 50, shown in FIG. 4A, may have first and second electrode structures so that the shape of each of the microlenses located in each of the through holes H can be selectively controlled. One example thereof is exemplified in FIG. 4B.

Referring to FIG. 4B, first and second electrodes are formed in a plurality of patterns Y1 to Y4 and X1 to X4 that can be applied to the microlens array shown in FIG. 4A. The first and second electrodes 52 and 56 have a structure in which the patterns are separated in rows and columns according to the arrangement of the through holes (or microlenses). Therefore, when the shape of resin that has a primary shape and is formed in a predetermined position $C_{43}$ is selectively controlled, a voltage is only applied to one pattern Y3 of the first electrode 52 and one pattern X4 of the second electrode 56, such that the desired fine control can be more easily achieved.

The above-described structure of the first and second electrodes 52 and 56 is very advantageous because the structure enables to selectively control a droplet of resin that has a different shape due to an unexpected error caused when droplets of resin are provided to the through holes to form a plurality of lenses.

The present invention can be applied as assemblies in which a plurality of lenses are arranged in one barrel so that the above-described optical components have the same optical path. Optical components that are formed into an assembly can be realized in a various manner according to a laminating method.

Figure 5A:
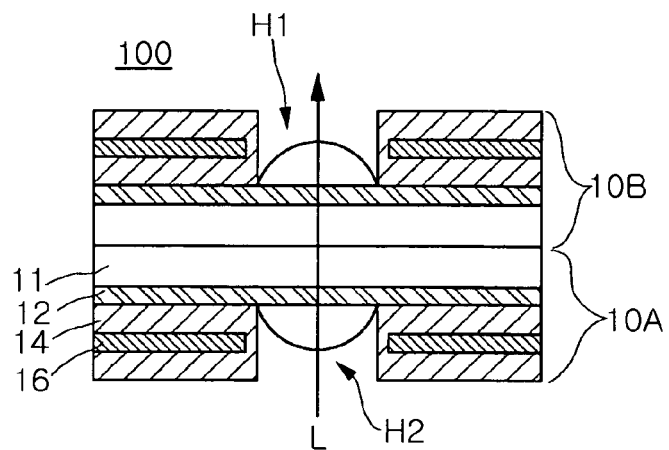
FIGS. 5A to 5C are side cross-sectional views illustrating examples of assemblies that include the optical components shown in FIGS. 1A and 1B.
Figure 5B:
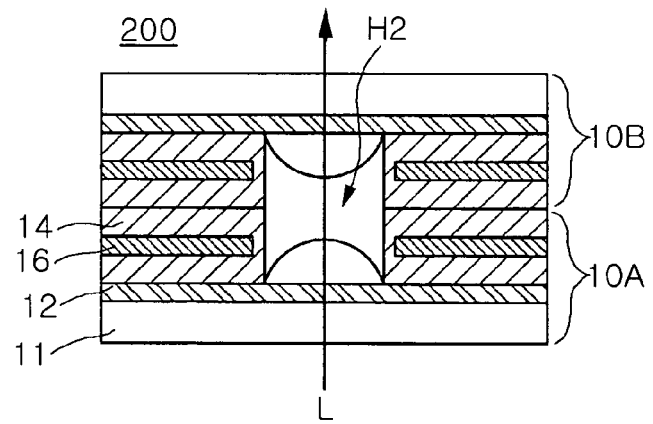
Figure 5C:
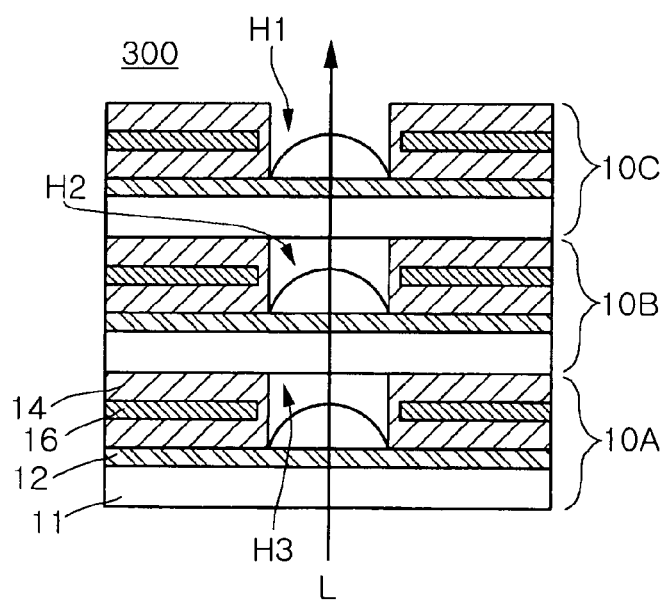

In FIGS. 5A to 5C, various kinds of assemblies 100, 200, and 300 using the optical components shown in FIGS. 1A and 1B are exemplified.

The assembly 100, shown in FIG. 5A, has a laminated structure in which openings of through holes H1 and H2 of two optical components 10A and 10B face opposite directions to ensure the same optical path L.

On the other hand, the assembly 200, shown in FIG. 5B, has a laminated structure in which the openings of the through holes H1 and H2 of the two optical components 10A and 10B face each other to ensure the same optical path L.

The assembly 300, shown in FIG. 5C, has a laminated structure in which openings of through holes H1, H2, and H3 of three optical components 10A, 10B, and 10C face one direction.

These various laminating methods may be easily used to control a distance between lenses. Therefore, in a case of an assembly that has three or more optical components laminated therein, the above-described laminating methods are selectively used according to the individual optical components to thereby ensure a desired distance between the lenses.

As set forth above, according to exemplary embodiments of the invention, units for applying an electrostatic force that are used in a process of fabricating a lens in an optical component are realized as a structure that ensures an optical path, such that an insulating structure and first and second electrodes, which are used as the units for applying the electrostatic force, can be used as a lens holder. Therefore, it is possible to more accurately fabricate a microlens having various shapes, such as a lens having a great numerical aperture and an aspherical lens, and it is also possible to easily provide an optical lens module structure that has a barrel structure for supporting the lens.

While the present invention has been shown and described in connection with the exemplary embodiments, it will be apparent to those skilled in the art that modifications and variations can be made without departing from the spirit and scope of the invention as defined by the appended claims.

What is claimed is:

1. An optical component comprising:
a lens holder including a first electrode, an insulating structure formed on the first electrode and having a through hole provided as an optical path, and at least one second electrode formed inside the insulating structure to encompass the through hole; and
at least one microlens located in the through hole to be surrounded by the lens holder and formed of cured transparent resin,
wherein the at least one microlens is fixed to a certain position of the through hole.

2. The optical component of claim 1, wherein the at least one microlens is in contact with the first electrode and is insulated from the at least one second electrode by the insulating structure of the lens holder.

3. The optical component of claim 1, wherein the first electrode is formed of a transparent material.

4. The optical component of claim 3, wherein the microlens is formed at a region of the first electrode that is provided as a bottom surface of the through hole.

5. The optical component of claim 4, wherein the lens holder further comprises a transparent substrate, and the first electrode is formed on the transparent substrate.

6. The optical component of claim 1, wherein the first electrode is formed of an opaque electrode material and has an opening formed to ensure an optical path.

7. The optical component of claim 6, wherein the opening of the first electrode has a smaller diameter than the through hole such that the first electrode provides a projection having a circumferential shape.

8. The optical component of claim 6, wherein the lens holder further comprises a transparent substrate, and the first electrode is formed on the transparent substrate.

9. An optical component comprising:
a lens holder including a first electrode, an insulating structure formed on the first electrode and having a through hole provided as an optical path, and at least one second electrode formed inside the insulating structure to encompass the through hole; and
at least one microlens located in the through hole and formed of transparent resin,
wherein the second electrode comprises a plurality of second electrodes, and the plurality of second electrodes are laminated inside the insulating structure and insulated from each other.

10. The optical component of claim 9, wherein at least some of the plurality of second electrodes are separated from inner side walls of the through hole by different distances.

11. The optical component of claim 1, wherein the through hole of the insulating structure and the microlens mounted to the through hole comprise a plurality of through holes and a plurality of microlenses, respectively.

12. The optical component of claim 11, wherein the through holes are arranged in a plurality of rows and in a plurality of columns.

13. The optical component of claim 12, wherein the first and second electrodes are formed in a plurality of patterns separated in the rows and the columns of the through holes.

14. An optical component comprising a plurality of optical components of claim 1, the plurality of optical components laminated to have the same optical path.

15. The optical component of claim 14, wherein at least some of the plurality of optical components are laminated so that openings of through holes thereof face one direction.

16. The optical component of claim 14, wherein at least one pair of the plurality of optical components are laminated so that the openings of the through holes thereof face each other or opposite directions.

17. A method of manufacturing an optical component, the method comprising:
preparing a lens holder including a first electrode, an insulating structure formed on the first electrode and having through holes provided as optical paths, and at least one second electrode formed in the insulating structure to encompass the through holes;
providing transparent liquid resin to each of the through holes to form a primary lens shape;
applying a voltage to the first and second electrodes by using an electrostatic force generated therebetween such that the liquid resin having the primary lens shape has a desired secondary lens shape; and
forming the microlens surrounded by the lens holder by curing the liquid resin having the secondary lens shape.

18. A method of manufacturing an optical component, the method comprising:
preparing a lens holder including a first electrode, an insulating structure formed on the first electrode and having through holes provided as optical paths, and at least one second electrode formed in the insulating structure to encompass the through holes;
providing transparent liquid resin to each of the through holes to form a primary lens shape;
applying a voltage to the first and second electrodes by using an electrostatic force generated therebetween such that the liquid resin having the primary lens shape has a desired secondary lens shape; and
forming the microlens by curing the liquid resin having the secondary lens shape,
wherein the transparent liquid resin provided to the through hole is in contact with the first electrode and is insulated from the at least second electrode by the insulating structure.

19. The method of claim 17, wherein the first electrode is formed of a transparent electrode material.

20. The method of claim 19, wherein the transparent liquid resin is formed at a region of the first electrode that is provided as a bottom surface of the through hole.

21. The method of claim 19, wherein the lens holder further comprises a transparent substrate, and the first electrode is formed on the transparent substrate.

22. The method of claim 17, wherein the first electrode is formed of an opaque electrode material and has an opening to ensure an optical path.

23. The method of claim 22, wherein the opening of the first electrode has a smaller diameter than the through hole such that the first electrode provides a projection having a circumferential shape.

24. The method of claim 22, wherein the lens holder further comprises a transparent substrate, and the first electrode is formed on the transparent substrate.

* * * * *